(12) United States Patent
Lin et al.

(10) Patent No.: US 9,146,363 B2
(45) Date of Patent: Sep. 29, 2015

(54) OPTICAL FIBER ADAPTER WITH SHUTTER MEMBER

(71) Applicant: EZONTEK TECHNOLOGIES CO., LTD., New Taipei (TW)

(72) Inventors: Sung-An Lin, Miaoli County (TW); Sung-Chi Lin, Miaoli County (TW)

(73) Assignee: Ezontek Technologies Co., Ltd., New Taipei (TW)

( * ) Notice: Subject to any disclaimer, the term of this patent is extended or adjusted under 35 U.S.C. 154(b) by 0 days.

(21) Appl. No.: 14/268,069

(22) Filed: May 2, 2014

(65) Prior Publication Data

US 2015/0117820 A1 Apr. 30, 2015

(30) Foreign Application Priority Data

Oct. 31, 2013 (TW) .............................. 102139717 A

(51) Int. Cl.
*G02B 6/36* (2006.01)
*G02B 6/38* (2006.01)
*G02B 6/26* (2006.01)

(52) U.S. Cl.
CPC ................ *G02B 6/387* (2013.01); *G02B 6/266* (2013.01); *G02B 6/3849* (2013.01)

(58) Field of Classification Search
USPC ..................................................... 385/77–78
See application file for complete search history.

(56) References Cited

U.S. PATENT DOCUMENTS

| 2007/0098330 A1 | 5/2007 | Ozawa et al. |
| 2009/0226141 A1* | 9/2009 | Lin et al. ........................ 385/134 |
| 2012/0195555 A1* | 8/2012 | Jibiki et al. ..................... 385/75 |
| 2013/0064517 A1* | 3/2013 | Lin et al. ........................ 385/134 |

FOREIGN PATENT DOCUMENTS

JP          2007-121614 A       5/2007

* cited by examiner

*Primary Examiner* — Eric Wong
(74) *Attorney, Agent, or Firm* — Rosenberg, Klein & Lee

(57) ABSTRACT

An optical fiber adapter includes a main body and an elastic shutter member. The main body has an axial passage defined by a first wall, a second wall, a third wall and a fourth wall, wherein the first wall faces the third wall and connects with the second and fourth walls. The passage has opposing first and second openings in the axial direction. A fixing plate is positioned above the third wall and a gap is formed between the fixing plate and the third wall. The shutter member includes a fixing portion, a shutter plate and a connecting portion. The fixing portion is positioned in the gap formed between the fixing plate and the third wall. The connecting portion connects the fixing portion with the shutter plate and clamps the fixing plate. The shutter plate extends from the connecting portion and into the passage.

9 Claims, 9 Drawing Sheets

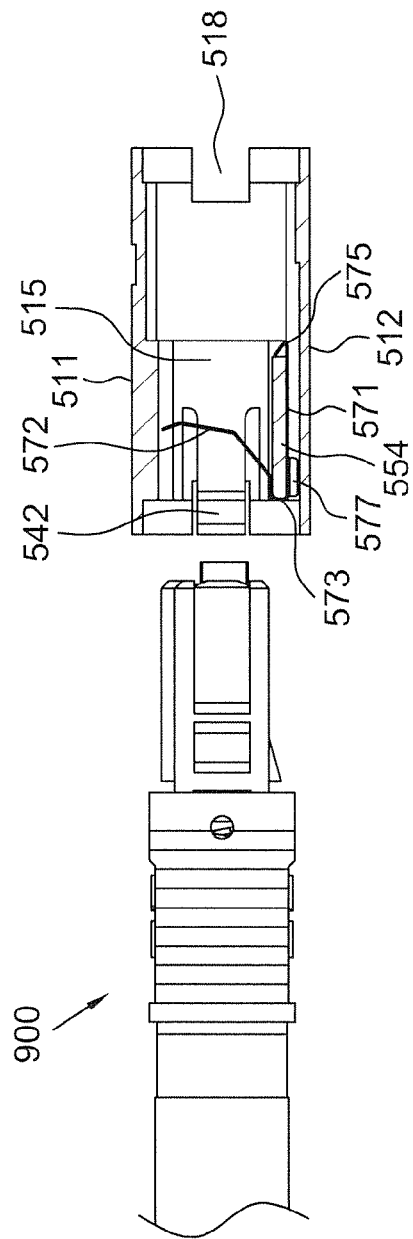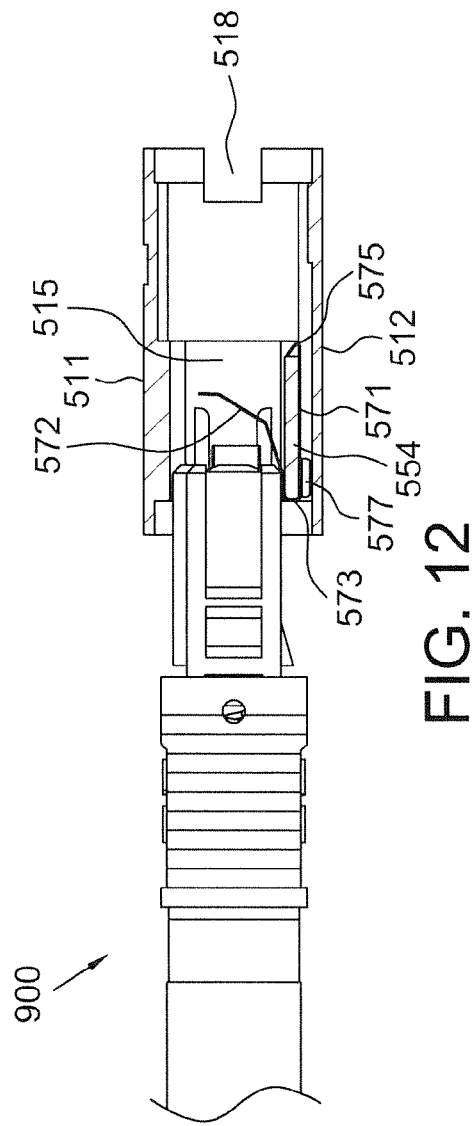

OPTICAL FIBER ADAPTER WITH SHUTTER MEMBER

RELATED APPLICATION

The present application is based on and claims priority to Taiwanese Application Number 102139717, filed Oct. 31, 2013, the disclosure of which is hereby incorporated by reference herein in its entirety.

BACKGROUND

1. Technical Field

The disclosure relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120 If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side wails 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY

The present disclosure provides a shutter member for an optical fiber adapter that may obstruct the light beams emitted from the passage thereby preventing the eyes from exposure to the light beams.

In one embodiment, the optical fiber adapter according to the present disclosure includes a main body and an elastic shutter member. The main body has an axial passage defined by a first wail, a second wall, a third wall and a fourth wall, wherein the first wall laces the third wall and connects with the second and fourth walls. The passage has opposing first and second openings in the axial direction. A fixing plate is positioned above the third wall and a gap is formed between the fixing plate and the third wall. The shutter member includes a fixing portion, a shutter plate and a connecting portion. The fixing portion is positioned in the gap formed between the fixing plate and the third wall. The connecting portion connects the fixing portion with the shutter plate and clamps the fixing plate. The shutter plate extends from the connecting portion and into the passage.

The foregoing, as well as additional objects, features and advantages of the disclosure will be more readily apparent from the following detailed description, which proceeds with reference to the accompanying drawings.

BRIEF DESCRIPTION OF THE DRAWINGS

FIGS. 11 and 12 illustrate how to mate an optical fiber connector with the optical fiber adapter of the present disclosure.

DETAILED DESCRIPTION OF THE PREFERRED EMBODIMENT

Figure 1:
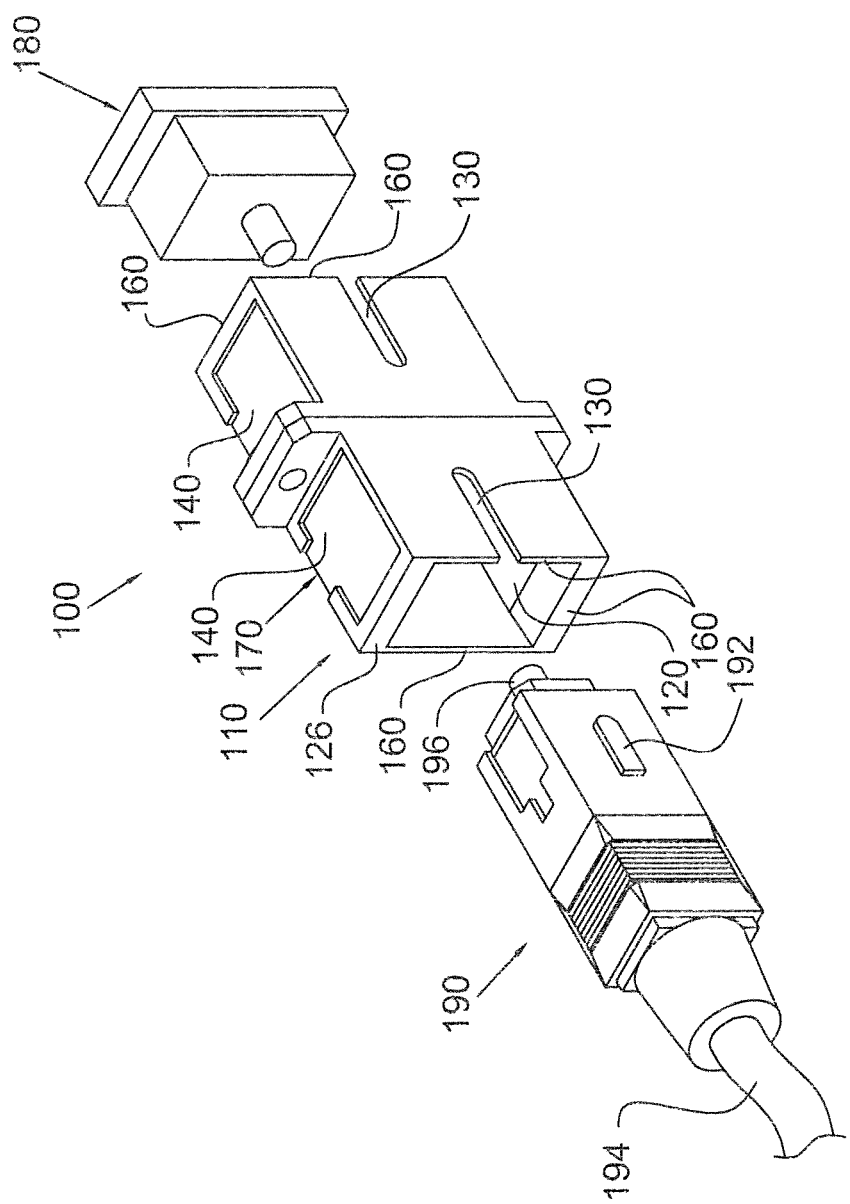
FIG. 1 is an elevated perspective view illustrating a conventional optical fiber adapter and a conventional optical fiber connector.
Figure 2:
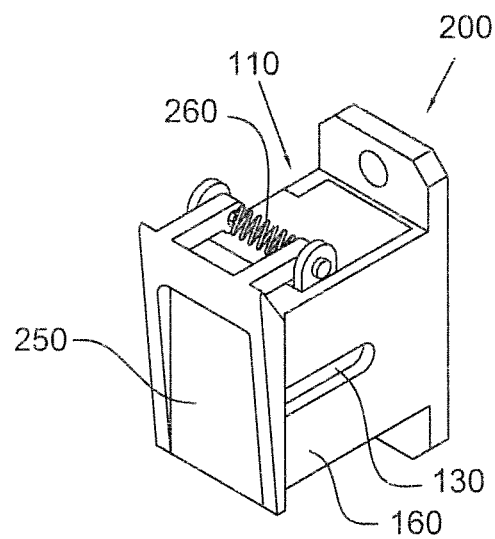
FIG. 2 is an elevated perspective view of a conventional optical fiber adapter with a cover for obstructing the light beams emitted from the receiving recess.
Figure 3:
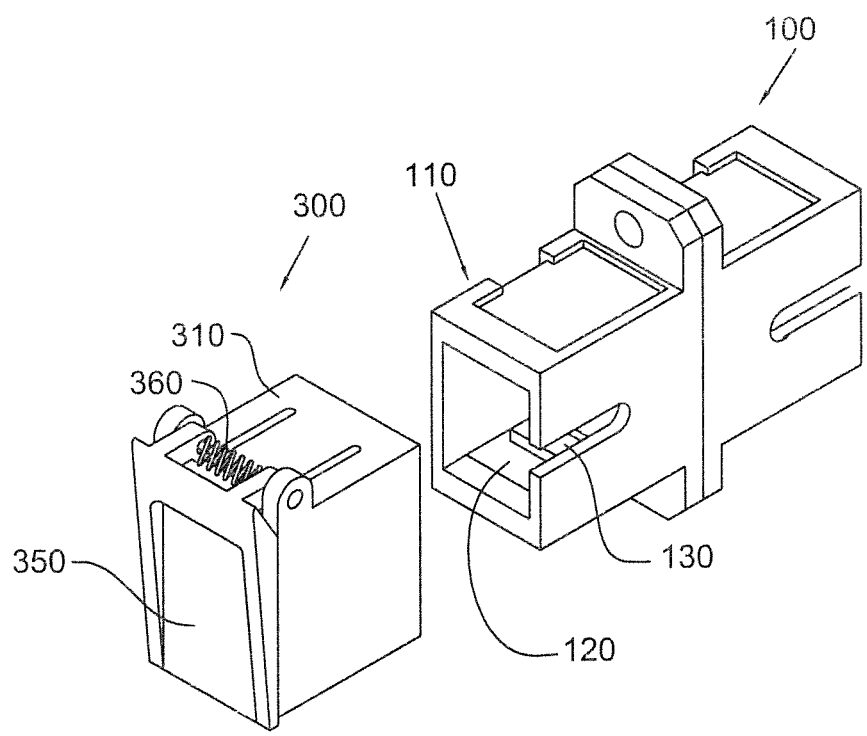
FIG. 3 is an elevated perspective view of a conventional protection cap for an optical fiber adapter.
Figure 4:
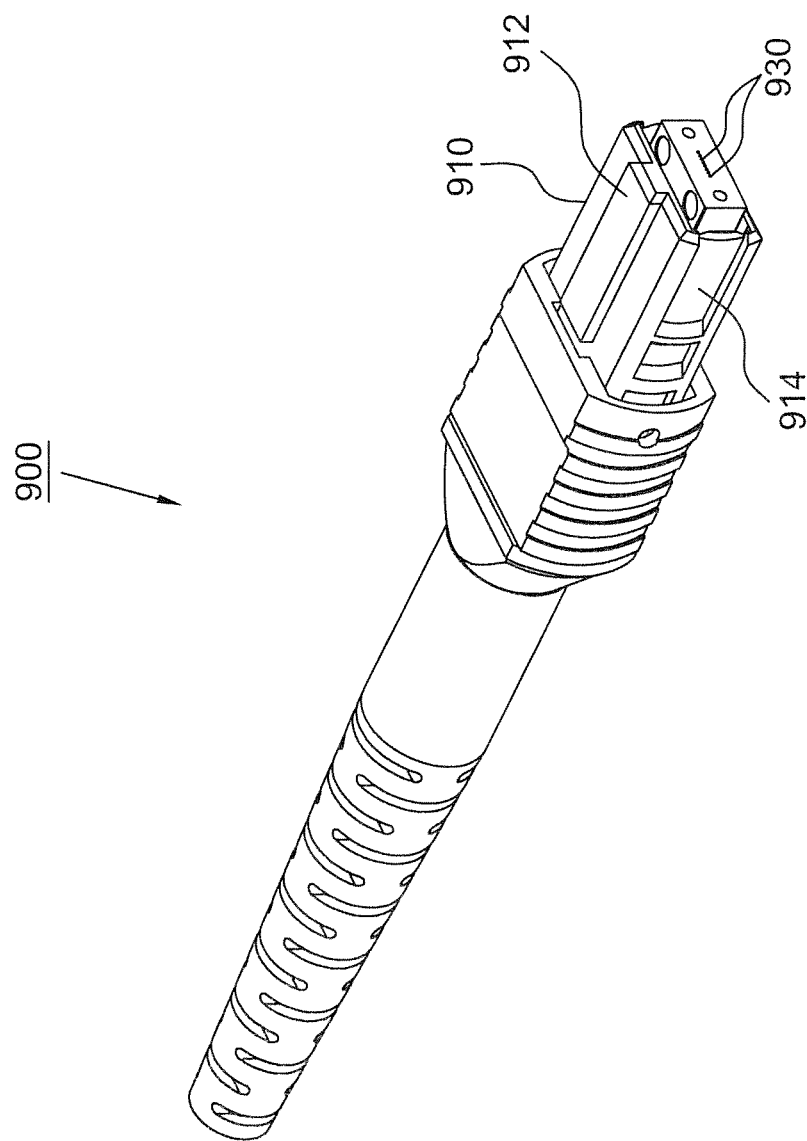
FIG. 4 is an elevated perspective view of a conventional MPO type optical fiber connector.

Referring to FIG. 4, it illustrates a conventional MPO type optical fiber connector 900. The connector 900 has a plurality of optical fibers 930 exposed from the front end thereof and a rectangular protrusion 912 formed on the upper surface of the main body 910. Recesses 914 are formed at both sides of the main body 910, respectively.

Figure 5:
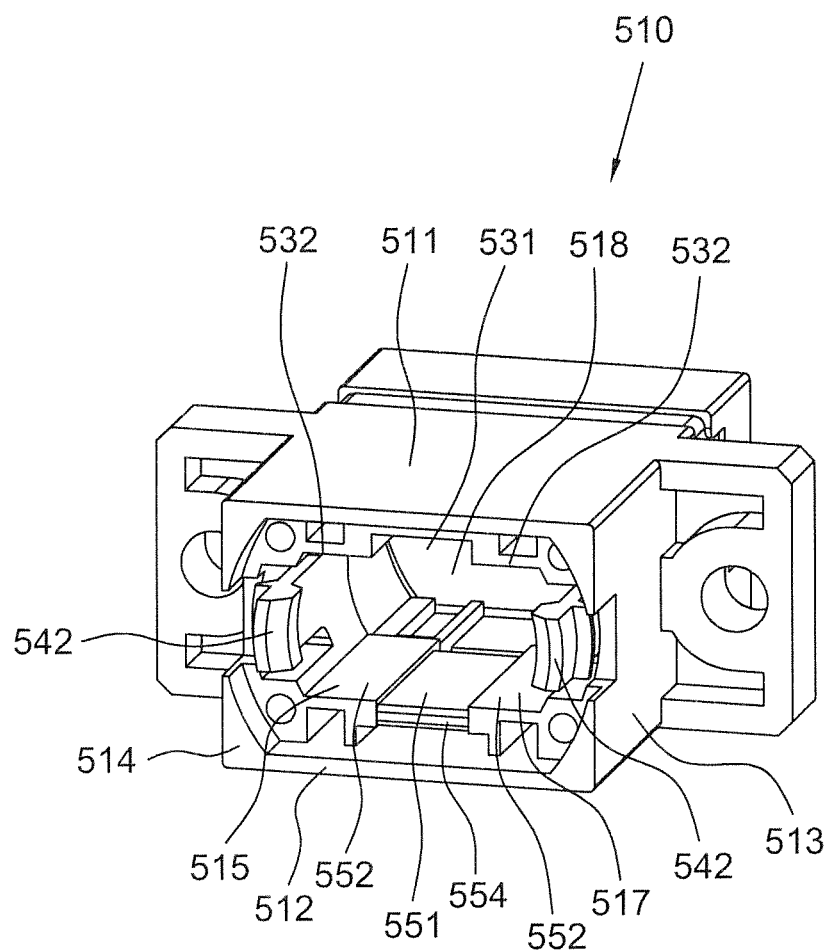
FIG. 5 is an elevated perspective view of the main body of the optical fiber adapter of the present disclosure.
Figure 6:
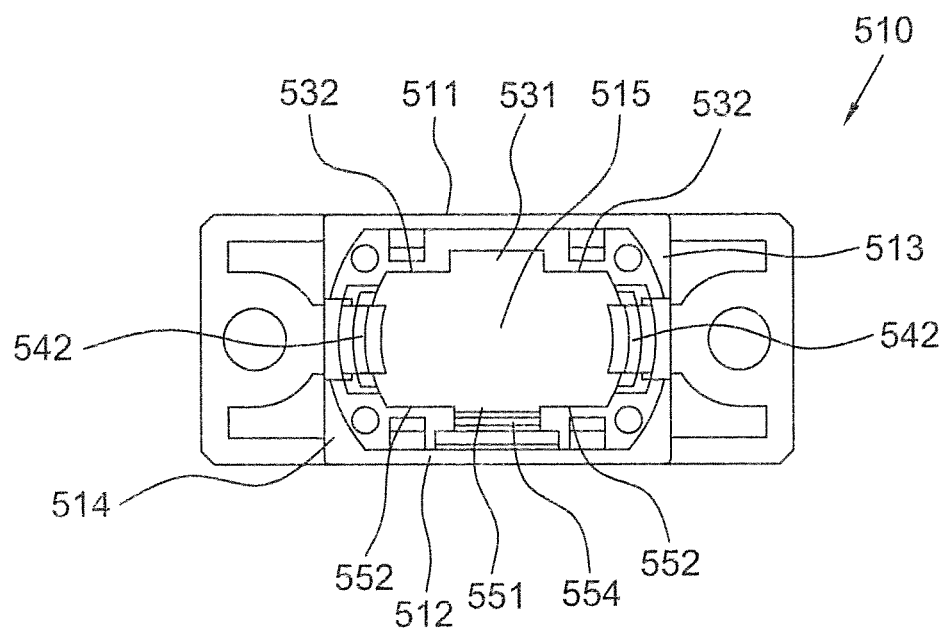
FIG. 6 is a front view of the main body of the optical fiber adapter of the present disclosure.

Referring to FIGS. 5 and 6, the optical fiber adapter according to the present disclosure may be a MPO type optical fiber adapter and includes a molded plastic main body 510. In one embodiment, the main body 510 is substantially rectangular and has a passage 515 in an axial direction defined by top wall 511, bottom wall 512, right wall 513 and left wall 514. The passage 515 of the main body 510 has opposing first opening 517 and second opening 518 in the axial direction, wherein the optical fiber connectors 900 of FIG. 4 may be inserted into the passage 515 through the openings 517, 518 respectively to mate with each other. Located near the first opening 517 on the top wall 511 are two opposing protrusions 532. An indentation 531 is formed between the protrusions 532 and has a width of greater than that of the protrusion 912 at the optical fiber connector 900 of FIG. 4 in order to receive the protrusion 912 when the connector 900 is inserted into the passage 515 through the first opening 517. Located near the first opening 517 on the bottom wall 512 are two opposing protrusions 552. A fixing plate 554 is arranged above the bottom wall 512 and between the protrusions 552. Therefore, a clear gap is formed between the fixing plate 554 and the bottom wall 512. The fixing plate 554 has a height from the bottom wall 512 that is smaller than the heights of the protrusions 552. In other words, an indentation 551 is formed between the protrusions 552 and above the fixing plate 554. Similarly, the indentation 551 has a width of greater than that of the protrusion 912 at the optical fiber connector 900 of FIG. 4 in order to receive the protrusion 912 when the connector 900 is inserted into the passage 515 through the first opening 517. In addition, two opposing hooks 542 are formed at the right and left walls 513, 514, respectively. The two hooks 542 are positioned to face each other and extend toward the first opening 517 to hook on to the recesses 914 on the optical fiber connector 900 when the connector 900 is inserted into the passage 515 through the first opening 517. In one embodiment, the hooks 542 are integrally formed with the right and left walls 513, 514, respectively.

Figure 7:
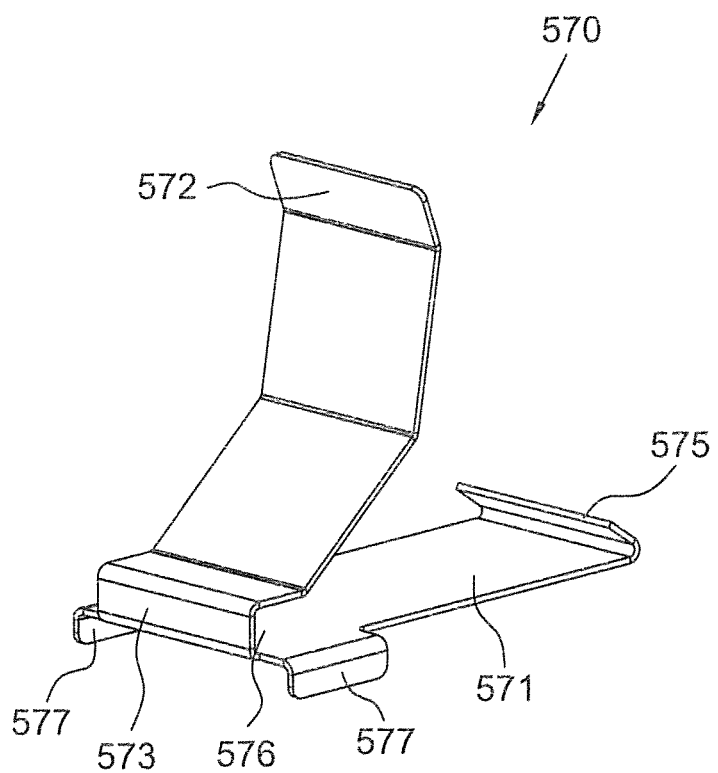
FIG. 7 is an elevated perspective view of the shutter member of the optical fiber adapter of the present disclosure.

Referring to FIG. 7, the optical fiber adapter of the present disclosure further includes an elastic shutter member 570 that is integrally formed with metal. The shutter member 570 includes a shutter plate 572, a fixing portion 571 and a connecting portion 573. The connecting portion 573 connects the fixing portion 571 with the shutter plate 572 and is generally U-shaped. That is, the connecting portion 573 is curved and has a notch 576. The notch 576 has a gap that is slightly smaller than the thickness of the fixing plate 554 of the main body 510. The fixing portion 571 is plate-like and has a rectangular shape. The shutter plate 572 may contain a single plate or several plates. The shutter plate 572 may move with respect to the fixing portion 571. The shutter plate 572 is moved close to the fixing portion 571 with a push force and quickly moves back when the push is withdrawn. Located near the connecting portion 573 at two opposing sides of the fixing portion 571 are two extending portions 577. The extending portions 577 extend downwards. In addition, a V-shaped hook 575 is arranged at the rear end of the fixing portion 571.

Figure 8:
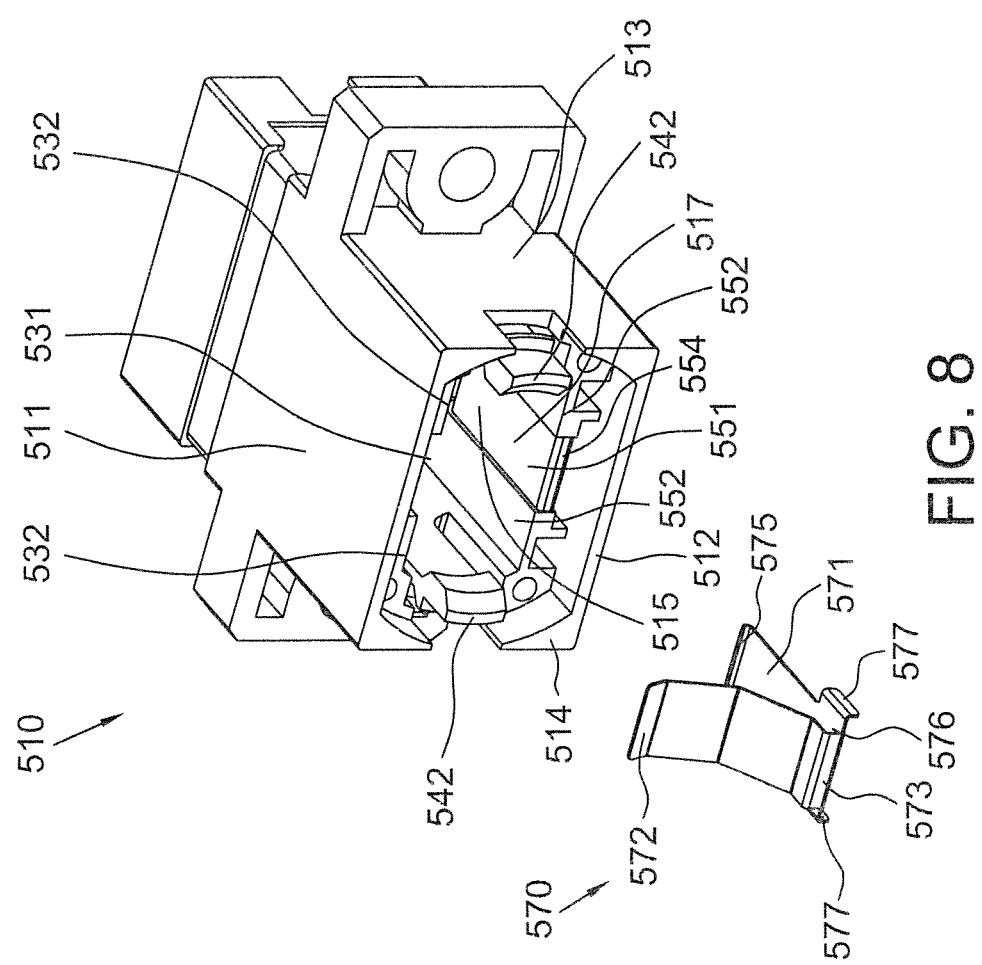
FIG. 8 is an elevated perspective view of the optical fiber adapter of the present disclosure, wherein the shutter member is separated from the main body.
Figure 9:
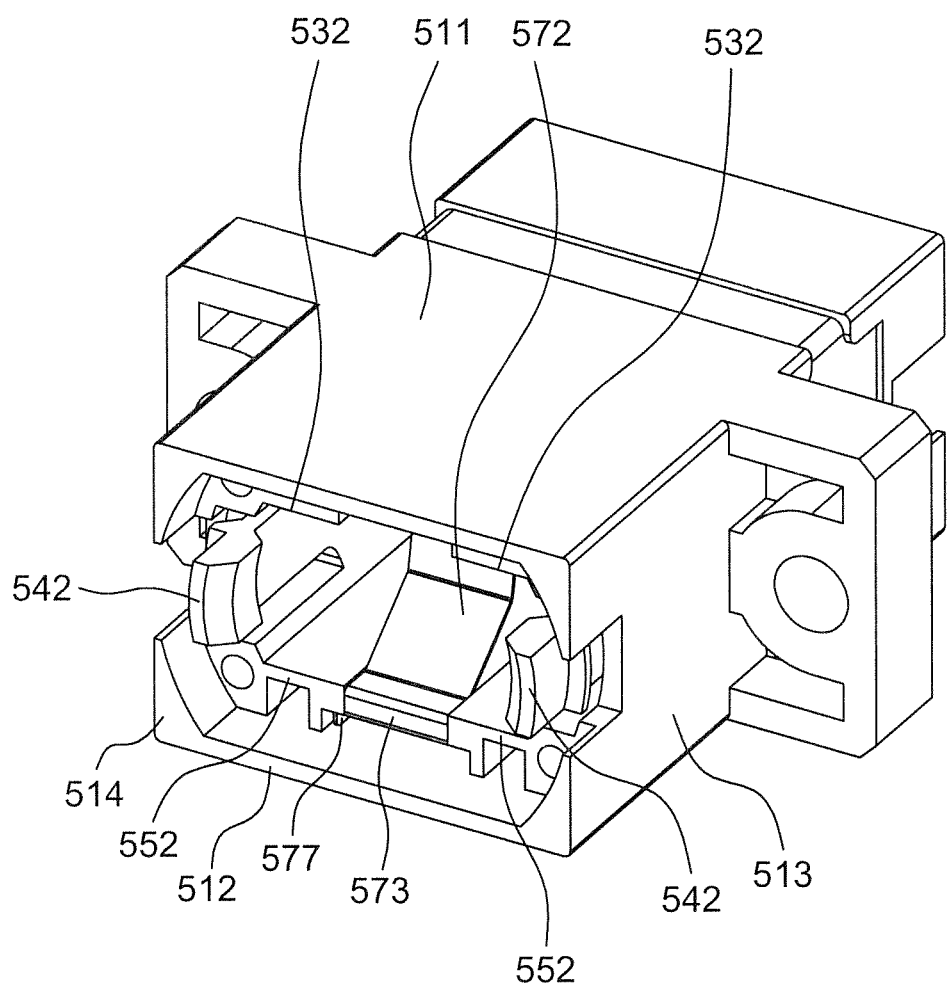
FIG. 9 is an elevated perspective view of the optical fiber adapter of the present disclosure.
Figure 10:
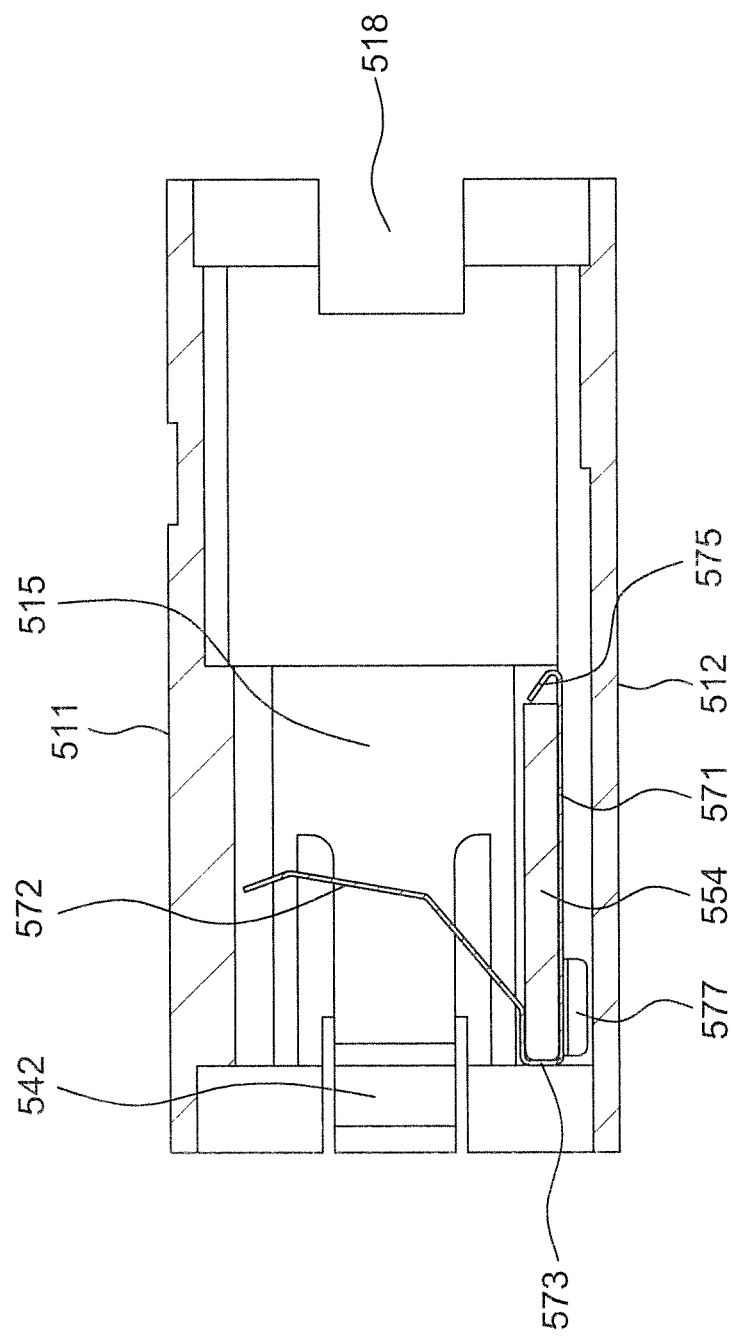
FIG. 10 is a cross-sectional view of the optical fiber adapter of the present disclosure.

Referring to FIGS. 8, 9 and 10, in assembling the optical fiber adapter of the present disclosure, the shutter member 570 is pushed into the passage 515 of the main body 510 through the first opening 517 in such a manner that the hook 575 passes through the gap formed between the fixing plate 554 and the bottom wall 512 and finally hooks on to the rear end of the fixing plate 554. At this moment, the fixing portion 571 is attached to the lower surface of the fixing plate 554 and the front end of the fixing plate 554 is inserted into the notch 576 of the connecting portion 573 such that the connecting portion 573 clamps the front portion of the fixing plate 554.

According to the present disclosure, since the hook 575 hooks on to the rear end of the fixing plate 554, it may prevent the shutter member 570 from being intentionally pulled out of the main body 510. As to the extending portions 577, they may facilitate an operator to assemble the shutter member 570 to the main body 510. More specifically, the operator may slide the extending portions 577 on the bottom wall 512 of the main body 510 without need to observe the position of the fixing plate 554 when installing the shutter member 570. In addition, the extending portions 577 may improve the rigidity of the connecting portion 573 so that the connecting portion 573 may clamp the fixing plate 554 more strongly.

Referring to FIGS. 11 and 12, according to the optical fiber adapter of the present disclosure, there is no need to detach the shutter member 570 from the main body 510 prior to inserting the optical fiber connector 900 into the passage 515 of the main body 510, When the connector 900 is inserted into the main body 510 through the first opening 517, it will push down the elastic shutter plate 572 to the gap between the connector 900 and the bottom wall 512 of the main body 510. Upon pulling out the connector 900, the elastic shutter plate 572 will quickly spring up to an original position to obstruct the light beams emitted from the passage 515 as a result of elasticity. As a result, the occurrence of exposure to the harmful light beams may be avoided.

According to the optical fiber adapter of the present disclosure, the shutter plate 572 will be located to obstruct the passage 515 when the shutter member 570 is positioned in place. This way the light beams emitted from the passage 515 may be obstructed thereby preventing a user's eyes from exposure to the harmful light beams.

Although the present disclose has been explained in detailed with MPO type optical fiber adapter, it will be appreciated that the optical fiber adapter of the present disclosure may include other types of optical fiber adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter for optically coupling two optical fiber connectors with each other, the optical fiber adapter comprising:
    a main body having a passage in an axial direction, the passage being defined by a first wall, a second wall, a third wall and a fourth wall, the first wall facing the third wall and connecting with the second and fourth walls, wherein the passage has opposing first and second openings in the axial direction to allow the two optical fiber connectors to be inserted into the passage to mate with each other, a fixing plate is positioned above the third wall and a gap is formed between the fixing plate and the third wall; and
    an elastic shutter member, including:
        a fixing portion positioned in the gap formed between the fixing plate and the third wall;
        a shutter plate;
        a connecting portion connecting a first end of the fixing portion with the shutter plate, wherein the connecting portion clamps to the fixing plate, the shutter plate elastically extending from the connecting portion into the passage of the main body; and
        two extending portions extending in the gap towards the third wall from opposing sides of the first end of the fixing portion, the extending portions being configured to slide on the third wall to assist in installation of the elastic shutter member and add rigidity to the connecting portion.

2. The optical fiber adapter as claimed in claim 1, wherein the shutter member further comprising:
    a hook connecting with the fixing portion, configured to hook on to the fixing plate.

3. The optical fiber adapter as claimed in claim 2, wherein the hook extends from a second end of the fixing portion and is configured to hook on to a rear end of the fixing plate.

4. The optical fiber adapter as claimed in claim 1, wherein the main body further comprising:
    two protrusions positioned on the third wall, wherein the fixing plate is positioned between the protrusions and has a height from the third wall that is smaller than heights of the protrusions.

5. The optical fiber adapter as claimed in claim 1, wherein the main body further comprising:
    two hooks extending from the second and fourth walls, respectively, the hooks being configured to hook on to one the optical fiber connector.

6. The optical fiber adapter as claimed in claim 1, wherein the optical fiber connectors are MPO type.

7. An optical fiber adapter for optically coupling two optical fiber connectors with each other, the optical fiber adapter comprising:
    a main body having a passage in an axial direction, the passage being defined by a first wall, a second wall, a third wall and a fourth wall, the first wall facing the third wall and connecting with the second and fourth walls, wherein the passage has opposing first and second openings in the axial direction to allow the two optical fiber connectors to be inserted into the passage to mate with each other, a fixing plate is positioned above the third wall and a gap is formed between the fixing plate and the third wall; and
    an elastic shutter member, including:
        a fixing portion positioned in the gap formed between the fixing plate and the third wall;
        a connecting portion extending from the fixing portion, the connecting portion clamps to the fixing plate; and
        a shutter plate elastically extending from the connecting portion into the passage of the main body, the shutter plate having multiple plate sections, each plate section being angularly disposed relative to an adjacent plate section.

8. The optical fiber adapter as claimed in claim 7, wherein the shutter plate has three plate sections.

9. The optical fiber adapter as claimed in claim 7, wherein the fixing portion has two extending portions disposed adjacent the connecting portion and extending in the gap towards the third wall from opposing sides thereof to add rigidity to the connecting portion.

* * * * *